Nov. 30, 1965          J. R. PREZIOSI          3,220,078
                        ROTARY FASTENER
Filed Aug. 8, 1963                      2 Sheets-Sheet 1
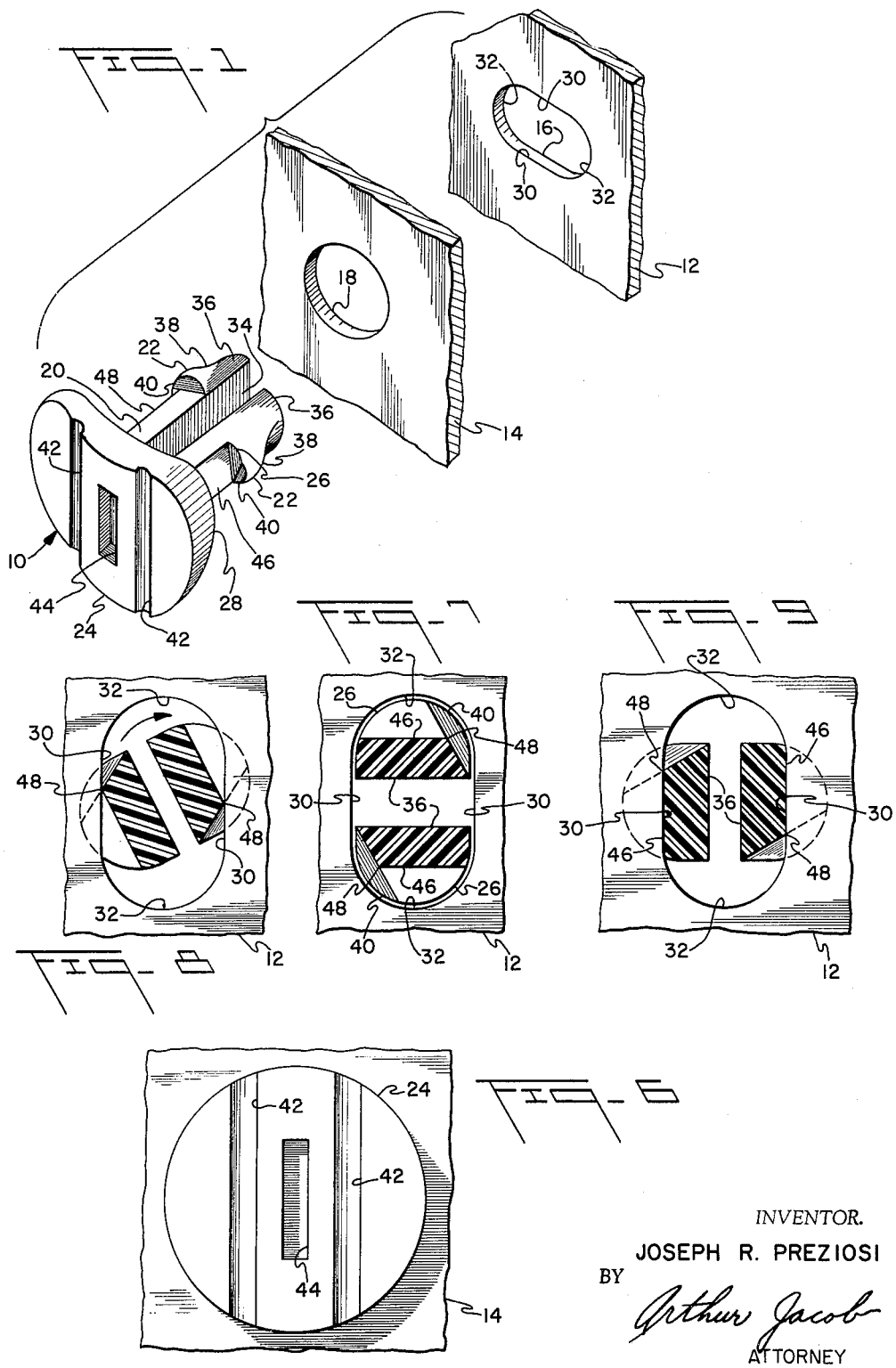
INVENTOR.
JOSEPH R. PREZIOSI
BY
*Arthur Jacob*
ATTORNEY

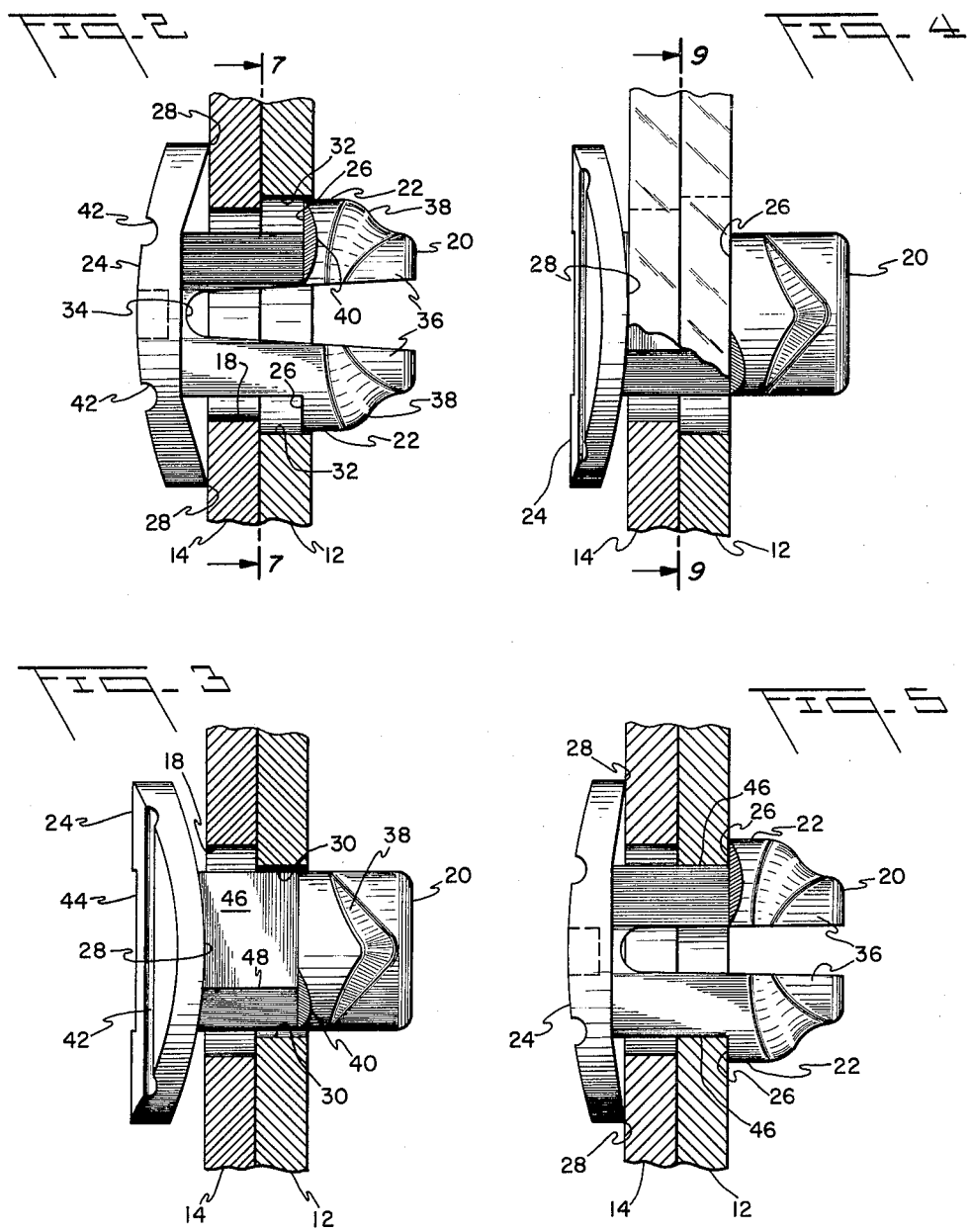

United States Patent Office 3,220,078
Patented Nov. 30, 1965

3,220,078
ROTARY FASTENER
Joseph R. Preziosi, Clark, N.J., assignor to Elastic Stop Nut Corporation of America, Union, N.J., a corporation of New Jersey
Filed Aug. 8, 1963, Ser. No. 300,803
1 Claim. (Cl. 24—221)

The present invention relates generally to fasteners and pertains more specifically to fasteners fabricated in one piece and capable of detachably securing together apertured workpieces by merely being inserted through the apertures in the workpieces and then rotated less than one full turn, preferably about a quarter of a turn, in one direction to secure the workpieces together and can then be rotated in the opposite direction back to the original position to release the workpieces.

In many installations it becomes necessary to assemble workpieces, generally in the form of panels, quickly and effectively in a manner which will permit ready disassembly when required. It has been found desirable to have available fasteners which are capable of securing such workpieces in proper assembled relationship and which will quickly and easily release the workpieces for disassembly. A variety of such fasteners have been made available in an effort to meet the demand for ease of use and satisfactory performance over variations in operating conditions along with economy of manufacture.

It is therefore an important object of the invention to provide a fastener for detachably securing together apertured workpieces in assembled relationship, the fastener being capable of quick and easy operation in both assembling and disassembling such workpieces.

Another object of the invention is to provide a fastener capable of quickly and easily securing together and releasing apertured workpieces with a minimum amount of time consuming manipulation and without requiring special tools for installation or operation.

Another object of the invention is to provide a fastener for detachably securing together apertured workpieces, which fastener is capable of being captivated within one of such workpieces even when the workpieces are disassembled for convenience in assembly and disassembly of the workpieces.

Still another object of the invention is to provide a fastener for detachably securing together apertured workpieces, which fastener furnishes a positive indication of when it is in position to secure the workpieces and cannot sembling and disassembling such workpieces.

A further object of the invention is to provide a fastener for detachably securing together apertured workpieces, the fastener being capable of effectively accommodating a relatively wide range of tolerances in the workpiece dimensions and aperture alignment and not damaging the workpieces during operation and use.

A still further object of the invention is to provide a fastener capable of quickly and easily securing together and releasing apertured workpieces, the fastener having a simple construction being capable of easy fabrication in one piece and economical manufacture of relatively inexpensive materials in large numbers of uniform quality.

The invention may be described briefly as a one-piece fastener for use in detachably securing together apertured first and second workpieces, the assembled workpieces having a given total thickness, the first workpiece aperture being non-circular and having a major dimension and a relatively smaller minor dimension. The fastener has an axially extending shank and at least one clamping surface integral with the shank and projecting outwardly therefrom a radial distance greater than the minor dimension. A head is integral with the shank and has at least a portion capable of elastic deflection between a first position lying axially away from the clamping surface a distance less than the above thickness and a second portion lying axially away from the clamping surface a distance equal to that thickness. A lead-in surface extends in a direction from the clamping surface away from the head to a position displaced axially from the head portion a distance greater than the above thickness when the portion is in the first position such that upon assembly of the fastener and the workpieces with the clamping surface oriented along the major dimension and rotation of the clamping surface in a given direction toward the minor dimension, the lead-in surface will engage the first workpiece and continued rotation will elastically deflect the head portion until the portion reaches the second position and the workpieces are secured between the head and the clamping surface. Means are provided integral with the shank for limiting rotation of the clamping surface in the given direction to positively preclude rotation beyond the orientation with the minor dimension to orientation with the major dimension and consequent release of the fastener and releasably retaining the clamping surface oriented with the minor dimension against unwanted rotation back toward the major dimension.

The invention will be more fully understood and further objects and advantages thereof will become apparent in the following detailed description of an embodiment of the invention illustrated in the accompanying drawing in which:

FIGURE 1 is a perspective view of a fastener constructed in accordance with the invention about to be inserted through apertured workpieces to secure the workpieces together;

FIGURE 2 is a plan view partially sectioned to illustrate the fastener of FIGURE 1 inserted through the workpieces, but not yet in secured position;

FIGURE 3 is a partially sectioned elevational view of the assembly of FIGURE 2;

FIGURE 4 is a plan view partially sectioned to illustrate the fastener of FIGURE 1 securing the workpieces together;

FIGURE 5 is a partially sectioned plan view of the assembly of FIGURE 4;

FIGURE 6 is an end view of the fastener of FIGURE 1 installed in the workpieces;

FIGURE 7 is a sectional view taken along line 7—7 of FIGURE 2;

FIGURE 8 is a sectional view similar to FIGURE 7 showing the fastener rotated clockwise with respect to the position in FIGURE 7; and FIGURE 9 is a sectional view taken along line 9—9 of FIGURE 4.

Referring to the drawings, and particularly to FIGURE 1, a fastener constructed in accordance with the invention is indicated generally at 10 and is shown about to be assembled with a first plate-like workpiece 12 and a second plate-like workpiece 14 to secure the workpieces together, the first workpiece 12 having a non-circular aperture 16 and the second workpiece having a circular aperture 18.

It is the function of the fastener 10 to effectively secure the workpieces 12 and 14 together in face-to-face abutting relationship and to enable release of the workpieces from one another in an easy and rapid manner whenever desired. Such fasteners find use in a variety of installations, particularly where a first panel is to be detachably secured to a second panel. For example, a removable cover plate may be fixed over an opening in a panel by means of a fastener of the invention, in which case workpiece 12 could represent the panel while workpiece 14 would represent the cover plate, and the cover plate would then be removable to provide access to the opening whenever desired.

In order to effectively perform the above function, fastener 10 includes an axially extending shank 20 which is provided with integral opposed protuberances 22 projecting radially outwardly adjacent a first end thereof and an integral head 24 adjacent the second end of the shank 20. As best seen in FIGURES 1, 2 and 3, protuberances 22 are each furnished with a clamping surface 26 facing head 24, and head 24 has portions 28 which normally are axially displaced from clamping surfaces 26 a distance less than the total thickness of the assembled workpieces 12 and 14. Thus, in FIGURES 1 and 2, the workpieces 12 and 14 are not secured together by the fastener 10, but are merely placed in abutting relationship with the shank of the fastener projecting through apertures 16 and 18. It is noted that aperture 16 has a major dimension, bounded by aperture end walls 30 (also see FIGURES 7, 8 and 9), and a minor dimension, bounded by side walls 32, while aperture 18 is circular and has a diameter slightly smaller than the normal radial extent of protuberances 22, which normal radial extent is greater than the minor dimension of aperture 16, but somewhat smaller than the major dimension. Hence, when fastener 10 is in the position shown in FIGURES 1 and 2, workpieces 12 and 14 may be readily disassembled by merely moving the workpiece 12 to the right. However, fastener 10 cannot be inadvertently removed from aperture 18 once it is inserted as shown in FIGURES 2 and 3 since the fastener becomes captivated by virtue of the projection of protuberances 22 radially beyond the diameter of aperture 18. In order to achieve the insertion illustrated, it is necessary that protuberances 22 be capable of radial movement toward one another so that the protuberances will clear the wall of aperture 18 when the fastener is inserted. It is desirable that such movement be resilient so that the protuberances will spring back to their original normal position and thus hold the fastener captive within aperture 18. Such an objective is accomplished by the provision of an axially disposed slot 34 which divides shank 20 into two identical legs 36 capable of elastic deflection toward and away from one another. Elastic deflection of legs 36 toward one another is accomplished during insertion of fastener 10 into aperture 18 by cam surfaces 38 which provide a surface on each protuberance 22 facing the first end of the shank and tapering toward a dimension smaller than the diameter of aperture 18 and which contact the wall of aperture 18 to move legs 36 radially inwardly to clear the aperture.

It is essential to the accomplishment of the assembly of workpiece 12 to workpiece 14, which now has the shank of fastener 10 projecting therethrough, that the fastener be oriented with protuberances 22 aligned with the major dimension of aperture 16, as seen in FIGURES 2, 3 and 7, otherwise the protuberances will contact the walls of aperture 16 and interfere with the placement of workpiece 12 in abutting relationship with workpiece 14. Thus, cam surfaces 38 are axially contoured, as best seen in FIGURE 3, so that the slightest axial force applied to the protuberances 22 by virtue of their contact with workpiece 12 during assembly will cause the fastener to rotate until the radial extremities of the protuberances are aligned with the major dimension of aperture 16. It will be apparent that the provision of cam surfaces 38 thereby eliminates the need for any hand positioning or orientation of the fastener to allow easy entry of the protuberances into the aperture 16.

Once the fastener 10 and the workpieces 12 and 14 have been brought to the positions shown in FIGURES 2 and 3, the workpieces may be secured together by merely rotating the fastener 10 one-quarter turn in a clockwise direction as seen in FIGURE 7 to reach the clamped position illustrated in FIGURES 4, 5 and 9. During such rotation (see FIGURE 8) lead-in surfaces 40, which are contiguous with each clamping surface 26 and are inclined relative thereto so as to normally extend axially from the clamping surface away from head portions 28 a distance greater than the total thickness of assembled workpieces 12 and 14 (see FIGURES 2 and 3), will come into contact with the walls of aperture 18 and upon continued rotation of the fastener, and of protuberances 22 toward orientation with the minor dimension of aperture 18, the inclined lead-in surfaces 40 will draw the shank 20 toward the right, as seen in FIGURES 4 and 5, thereby elastically deflecting head portions 28 until clamping surfaces 26 become seated against the surface of workpiece 12. The elastic deflection of head portions 28 establishes a clamping force securing workpieces 12 and 14 together between the head 24 and the clamping surfaces 26. Such elastic deflection of the head portions is facilitated by the provision of grooves 42 (also see FIGURE 6) which ease the bending of portions 28 relative to the remainder of the head. Rotation of the fastener requires no special tools and can be accomplished with an ordinary screw driver which may be engaged with slot 44 provided therefor. As best seen in FIGURE 6, both the grooves 42 and the slot 44 furnish the fastener with a means for visually determining the orientation of the fastener so that it is possible to distinguish whether a fastener in a particular installation is in a clamped or unclamped position by inspection of the head. This determination in FIGURE 6 is left to the reader.

Adequate clamping force is available over a varying amount of elastic deflection in the head of the fastener; hence, a fastener of given dimensions can accommodate a relatively wide range of total workpiece thicknesses without a loss of clamping abilities. Thus, the number of sizes in which fasteners of the invention are manufactured and supplied may be minimized.

Turning now to FIGURES 7, 8 and 9, it may be seen that the rotation of the fastener from an unclamped (FIGURE 7) to a clamped (FIGURE 9) position is limited to approximately the ninety degrees lying between the major and minor dimensions of aperture 16, or about one-quarter of a full turn. Upon completion of the quarter turn, flat surfaces 46 of legs 36 of shank 20 will engage side walls 32 of aperture 18 and act as stop means precluding further clockwise rotation of the fastener.

An important feature of the fastener of the invention resides in the fact that the normal radial distance between flat surfaces 46 (as seen in FIGURES 2 and 7) is almost equal to and preferably slightly greater than the minor dimension of aperture 16 (as seen in FIGURES 5 and 9) so that the straight line distance between edges 48 of legs 36 is significantly greater than the distance between side walls 32. Thus, during rotation of the fastener from an unclamped to a clamped position, the operator will experience a definite feeling of "snap" as edges 48 come into contact with aperture walls 32 and force legs 36 to flex toward one another, as seen in FIGURE 8, and then legs 36 flex away from one another as flat surfaces 46 seat against aperture walls 32 so that the operator has a positive indication that the fastener has been rotated into the full clamping position shown in FIGURE 9. Of perhaps greater importance is that the dimensional interference between shank 20 and aperture 16 established by edges 48 serves to positively lock the fastener in the clamped position and thereby precludes inadvertent or unwanted rotation back toward the unclamped position where separation of the workpieces could take place. Thus, a positive twisting force must be applied to the fastener to rotate it either from an unclamped to a clamped position or back to an unclamped position from a clamped position to effect the flexing of legs 36 toward one another.

A further advantage is attained through the employment of the above described mechanism in that should a fastener 10 be installed in workpieces having a total thickness so much less than the normal distance between head portions 28 and clamping surfaces 26 that an adequate clamping force cannot be established, or for some other reason an adequate clamping force is not established when the fastener is rotated into clamping position, the flat surfaces 46 will still tend to remain seated against the aperture walls 32 and prevent rotation of the protuberances 22 back toward orientation with the major dimension of aperture 16 so that the protuberances remain aligned with the minor dimension of aperture 16, thus precluding separation of workpieces 12 and 14 even in the absence of a clamping force between the head and the protuberances.

In addition to allowing the above described mechanism to take place, the radial resilience provided in shank 20 by slot 34 allows the fastener 10 to readily accommodate a degree of misalignment in apertures 16 and 18 without harmful effects.

Fastener 10 is easily fabricated of a wide variety of materials which possess the requisite strength and resilience to attain proper operation of the device. While metallic materials are feasible, it has been found that the unitary structure of the fastener lends itself to being readily molded of a synthetic resin having the necessary degree of resiliency and mechanical strength. Of those materials available, nylon, a generic term for a variety of polyamide resins, and thermoplastic acetal resins, known commercially as "Delrin," have been found to be quite suitable.

It will be apparent that fastener 10 is easily installed and operated to allow ready assembly as well as disassembly of apertured workpieces. The fastener is self-aligning upon assembly to reduce time consuming manipulations and requires only one-quarter of a turn to clamp or unclamp assembled workpieces. Operation of the device is readily accomplished without special tools and will not damage the workpieces. Furthermore, the construction of the fastener provides a positive means for preventing inadvertent or undesired release of the device from its clamping position to preclude unwanted disassembly of the workpieces.

It is to be understood that the above detailed description of an embodiment of the invention is provided by way of example only and is not intended to restrict the invention. Various details of design and construction may be modified without departing from the true spirit and scope of the invention as defined in the appended claim.

I claim:

A one-piece fastener for use in detachably securing together apertured first and second workpieces, the first workpiece aperture being non-circular and having a major dimension and a relatively smaller minor dimension, said fastener comprising:

(A) an axially extending shank having first and second ends;

(B) opposed protuberances integral with said shank adjacent said first end and projecting outwardly therefrom a radial distance greater than said minor dimension;

(C) a head integral with said shank adjacent said second end and having radially extending portions;

(D) a clamping surface on each said protuberance facing said second end such that upon assembly of said fastener and said workpieces with said protuberances oriented along said major dimension and rotation of said protuberances in a given direction toward orientation with said minor dimension, said workpieces will be secured between said head portions and said clamping surfaces;

(E) a longitudinally directed slot in said shank extending transversely thereof to divide said shank into axially projecting first and second legs displaced from one another by the lateral width of said slot and resiliently movable radially toward and away from one another; and (F) a flat surface upon each said leg, said flat surfaces being parallel, each flat surface extending longitudinally between said head and one said protuberance and transversely from a first longitudinal edge to a second longitudinal edge, the first longitudinal edge of one leg being diametrically opposed to the corresponding first longitudinal edge of the other leg and the second longitudinal edge of one leg being diametrically opposed to the corresponding second longitudinal edge of the other leg;

(G) the straight line diametric distance between said first longitudinal edges being less than the straight line diametric distance between said second edges and both said distances normally being greater than the minor dimension of the non-circular aperture when said legs are displaced from one another by the width of said slot;

(H) the width of said slot being great enough so that upon rotation of the fastener in said given direction, movement of said legs toward one another will allow the diametric distance between said corresponding first edges to be decreased to essentially equal said minor dimension but will maintain the diametric distance between said corresponding second edges greater than said minor dimension thereby limiting rotation of said protuberances in said given direction to positively preclude rotation beyond said orientation with said minor dimension to orientation with said major dimension and subsequent release of the fastener, with said flat surfaces releasably retaining said protuberances oriented with said minor dimension against unwanted rotation back toward said major dimension.

References Cited by the Examiner

UNITED STATES PATENTS

| | | | |
|---|---|---|---|
| 536,321 | 3/1895 | Turner | 24—221 |
| 2,032,315 | 2/1936 | Chaffee | 24—221 |
| 2,080,769 | 5/1937 | Fitts | 24—221 |
| 2,133,781 | 10/1938 | Johnson | 24—221 |
| 2,309,733 | 2/1943 | Jones. | |
| 2,580,319 | 12/1951 | Poupitch. | |
| 2,728,259 | 12/1955 | Poupitch | 24—221 |
| 2,817,135 | 12/1957 | Harris. | |
| 2,940,558 | 6/1960 | Schlueter | 24—221 |
| 3,109,214 | 11/1963 | Clay. | |
| 3,116,526 | 1/1964 | Cochran | 24—221 |

FOREIGN PATENTS

| | | |
|---|---|---|
| 1,193,882 | 11/1959 | France. |
| 1,106,122 | 5/1961 | Germany. |
| 667,946 | 3/1952 | Great Britain. |

WILLIAM FELDMAN, *Primary Examiner.*

BERNARD A. GELAK, *Examiner.*